Feb. 5, 1946.   A. R. VAN C. WARRINGTON   2,394,126
SWITCHING ARRANGEMENT FOR ELECTRIC SYSTEMS
Filed Nov. 24, 1943
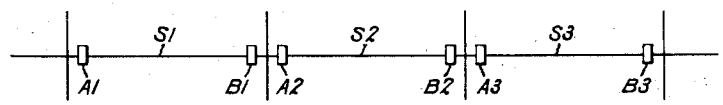
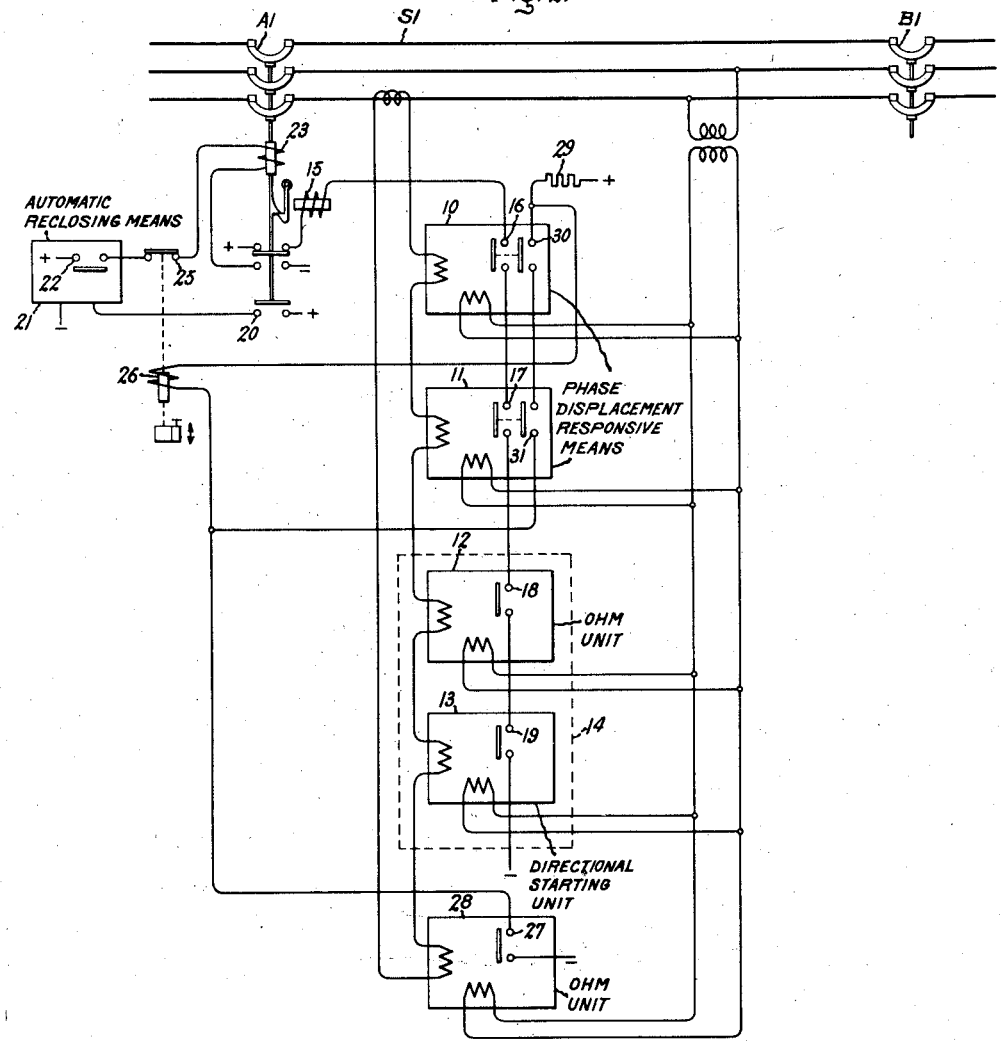
Inventor:
Albert R. van C. Warrington,
by *Harry E. Dunham*
His Attorney.

Patented Feb. 5, 1946

2,394,126

UNITED STATES PATENT OFFICE 2,394,126

SWITCHING ARRANGEMENT FOR ELECTRIC SYSTEMS

Albert R. van C. Warrington, Wallingford, Pa., assignor to General Electric Company, a corporation of New York Application November 24, 1943, Serial No. 511,574

8 Claims. (Cl. 175—294)

My invention relates to switching arrangements for electric systems and particularly to an arrangement for controlling the connections of a section of a sectionalized electric circuit so as to effect the disconnection of the section in response to predetermined abnormal conditions existing therein and the automatic reconnection of a disconnected section under electric conditions thereof that indicate there is a good possibility that the section will remain in service if it is reconnected to the system.

My invention is particularly adapted for use in an electric system comprising a plurality of series connected sections with a circuit breaker at each end of each section. In such an electric system, each circuit breaker is often provided with means for effecting an instantaneous opening thereof when a fault occurs in the associated section and also when an out-of-step condition occurs therein and for effecting a time delayed opening of the circuit breaker when the fault occurs in some other section and the fault is not cleared within a predetermined time interval after it occurs. In order to maintain stability on such an electric system, it is sometimes desirable to effect a quick reclosure of a circuit breaker after an instantaneous opening thereof when the opening is effected in response to a fault in the associated section since the phase displacement of the two disconnected portions of the system at the time of the reclosure may be small enough to allow the two disconnected portions to pull into synchronism. However, if the instantaneous opening is the result of an out-of-step condition, it may be undesirable to effect an instantaneous reclosure because the angular displacement of the disconnected portions of the system may be too great at the instant they would be reconnected.

One object of my invention is to provide an improved automatic reclosing arrangement for a circuit breaker whereby a circuit breaker may be immediately reclosed in case it is opened by a fault but is prevented from being automatically reclosed in case it is opened in response to an out-of-step condition in the associated section.

My invention will be better understood from the following description when taken in connection with the accompanying drawing, and its scope will be pointed out in the appended claims.

In the accompanying drawing, Fig. 1 is a schematic diagram of an electric system which is divided by substations into three sections, each of which has at each of the two ends thereof a circuit breaker which may be provided with my improved automatic switching arrangement; and Fig. 2 diagrammatically illustrates an automatic switching arrangement embodying my invention, which may be used to control each of the circuit breakers shown in Fig. 1.

In the electric system shown in Fig. 1, each of the three sections has a circuit breaker at each end thereof, such as the circuit breakers AI and BI at the respective ends of section SI, A2, and B2 at the respective ends of section S2, and A3 and B3 at the respective ends of section S3. For the purpose of this description, it will be assumed that each of the substations has a suitable source, not shown, connected thereto so that when any one of the circuit breakers is opened, the two disconnected portions of the system are independently supplied with electric energy. Also, each circuit breaker is controlled by suitable protective means so that it is opened instantly when a fault occurs in the respective section or an out-of-step condition produces within the respective section an abnormal condition similar to that produced by a fault in the respective section that involves all of the phase conductors of the section. For example, the circuit breakers AI and BI at the respective ends of the section SI are arranged to be opened instantaneously when a fault occurs on the section SI and when an out-of-step condition produces within the section SI an abnormal electric condition similar to that produced by a fault in the section SI that involves all of the phase conductors of the section. Various protective arrangements for effecting the instantaneous opening of the circuit breakers at the respective ends of a section of an electric system under such abnormal conditions are well known in the art, and in the embodiment of my invention shown in Fig. 2, I have illustrated in part the protective arrangement disclosed and claimed in my copending application, Serial No. 502,156, filed September 13, 1943, and assigned to the assignee of this application. This protective arrangement includes in one embodiment thereof four electroresponsive device for each phase of the section. Two of the devices are preferably connected to the phase conductors of a section in the manner described in the aforementioned copending application so that they respectively respond at different angular displacements of the equivalent generating sources at the ends of the electric system so that during an out-of-step condition the contacts of both of the devices are simultaneously closed only during that portion of each slip cycle when the phase displacement of the sources is within a predetermined range not reached during a power swing. The other two electroresponsive devices are respectively a directional starting unit and an ohm unit of a conventional distance relay which is so set as to have a reach which preferably extends slightly beyond the other end of the protected section so that the distance relay normally responds to a fault anywhere on the protected section. As pointed out in my aforesaid copending application, by providing each phase conductor with a similar set of single phase relays and connecting the contacts of each set in series with the tripping coil of the associated circuit breaker, the breaker is instantly tripped in response to a fault in the protected section and also in response to an out-of-step condition but is not tripped by a power swing.

In Fig. 2, which diagrammatically illustrates an embodiment of my invention for controlling the circuit breaker A1 in Fig. 2 and which may be used to control in a similar manner each of the other circuit breakers, 10 and 11 represent the two electroresponsive devices which are responsive to the phase displacement of the equivalent generating sources at the ends of the electric system and which, therefore, distinguish between a power swing and either an out-of-step condition or a fault in the associated protected section S1, and 12 and 13 represent respectively the ohm unit and the directional starting unit of a distance relay 14. Since the construction and the connections of these electroresponsive devices form no part of my present invention and are fully disclosed in my aforesaid copending application and, furthermore, are now well known in the art, further description of such construction and connections is deemed unnecessary for the purpose of this application, and each of these devices has been illustrated in the drawing by a suitably labelled rectangle. The circuit breaker A1 is provided with a trip coil 15, the energizing circuit of which includes the series connected contacts 16, 17, 18, and 19 of the electroresponsive devices 10, 11, 12, and 13 respectively, so that all of these four contacts have to be closed simultaneously in order to effect the opening of the circuit breaker A1.

The circuit breaker A1 is also provided with suitable automatic reclosing means, examples of which are well known in the art, for normally effecting an instantaneous reclosure after an opening thereof. As shown in Fig. 2, the auxiliary contacts 20 on the circuit breaker A1 when it is open are arranged to complete a starting circuit for the automatic reclosing arrangement 21 so that it immediately closes its contacts 22 to complete an energizing circuit for the closing coil 23 of the circuit breaker A1. United States Letters Patent 2,059,836, granted November 3, 1936, on an application filed by A. E. Anderson and assigned to the assignee of this application, discloses in detail an automatic reclosing arrangement which may be used as the automatic reclosing means 21. However, since the details of such reclosing means constitute no part of my present invention, I have illustrated such automatic reclosing means by a suitably labelled rectangle in order to simplify the disclosure.

In order to prevent the automatic reclosing means 21 from effecting an instantaneous reclosure when the circuit breaker A1 is opened in response to an out-of-step condition, I included in the circuit of the closing coil 23 the contacts 25 of a control relay 26, the operating winding of which is connected in series with the contacts 27 of an ohm relay 28 and a resistor 29. The operating winding of the relay 26 is also connected in parallel with the series connected contacts 30 and 31 of the phase displacement responsive relays 10 and 11 respectively.

The ohm relay 28 has a very high ohmic setting so that its reach is much farther than the reach of the ohm unit 12 of the distance relay 14. Therefore during an out-of- step condition the relay 28 closes its contacts 27 before the out-of-step oscillation has progressed far enough to effect the simultaneous closure of the contacts of the phase displacement responsive relays 10 and 11 or the closure of the contacts 18 of the ohm unit 12. The control relay 26 is designed in any suitable manner so that it has a slight time delayed pickup and a relatively long time delayed dropout. The length of time it takes the relay 26 when energized to open its contacts 25 is adjusted in any suitable manner so that it is longer than the time required for both of the relays 10 and 11 to effect the simultaneous closure of the contacts 30 and 31 around the operating winding of the relay 26 when a fault occurs on section S1 and so that it is shorter than the time required for both of the relays 10 and 11 to effect the simultaneous closure of the contacts 30 and 31 during an out-of-step condition. Therefore, when the circuit breaker A1 is instantly opened in response to a fault on the section S1, the circuit of the trip coil 15 is completed through the contacts 16, 17, 18, and 19 of the relays 10, 11, 12, and 13 respectively so quickly that the relay 26 is not energized long enough to open its contacts 25 before the operating winding of the relay 26 is short-circuited by the simultaneous closure of the contacts 30 and 31 of the relays 10 and 11 respectively. Consequently, as soon as the circuit breaker A1 is opened so that its auxiliary contacts 20 are closed, the automatic reclosing means 21 is immediately operated to close its contacts 22 and effect through the contacts 25 of the relay 26 an instantaneous reclosure of the circuit breaker A1.

When, however, the circuit breaker A1 is opened in response to an out-of-step condition, before the out-of-step condition can effect the simultaneous closure of the contacts 16, 17, 18, and 19 of the relays 10, 11, 12, and 13, respectively, out-of-step condition causes the relay 28 to close its contacts 27 and to maintain these contacts closed for a sufficient length of time before the circuit of the closing coil 23 is completed so that the control relay 26 is energized long enough to open its contacts 25 in the circuit of the closing coil 23 before the circuit breaker A1 is tripped. Therefore, the automatic reclosing means 21 is rendered inoperative to reclose the circuit breaker A1 when it is opened in response to the out-of-step condition effecting the simultaneous closing of the contacts 16, 17, 18, and 19 of the relays 10, 11, 12, and 13 respectively.

By arranging the automatic reclosing means 21 in any suitable manner well known in the art so that it becomes inoperative to close the contacts 22 to effect further reclosures of the circuit breaker A1 if the breaker fails to remain closed for a predetermined time after any reclosure and by adjusting the dropout time of the control relay 26 so that it is longer than the time required to lock out the automatic reclosing means, the return of the control relay 26 to its normally deenergized position after it has been energized in response to an out-of-step condition does not effect a reclosure of the circuit breaker A1 because the energizing circuit of the closing coil 23 is maintained open at the contacts 22 of the automatic reclosing means 21.

While I have in accordance with the Patent Statutes shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. A control arrangement for a circuit breaker in an alternating current circuit comprising means responsive to a fault on said circuit for effecting an opening of said circuit breaker, means responsive to an out-of-step condition on said circuit for opening said circuit breaker, means for automatically reclosing said circuit breaker when it is open, and means responsive to an out-of-step condition on said circuit for rendering said automatic reclosing means inoperative to close said circuit breaker.

2. A control arrangement for a circuit breaker in an alternating current circuit comprising means responsive to a fault on said circuit for effecting an opening of said circuit breaker and an automatic reclosure thereof, and means responsive to an out-of-step condition on said circuit for effecting only an opening of said circuit breaker.

3. A control arrangement for a circuit breaker in an alternating current circuit comprising means responsive to a fault and an out-of-step condition on said circuit for effecting an opening of said circuit breaker, means for automatically reclosing said circuit breaker when it is open, and means controlled by said first mentioned means for rendering said reclosing means inoperative to reclose said circuit breaker when it is opened in response to an out-of-step condition.

4. A control arrangement for a circuit breaker in an alternating current circuit comprising means including a phase displacement responsive relay for effecting an opening of said circuit breaker in response to a fault and to an out-of-step condition on said circuit, means for automatically reclosing said circuit breaker when it is open, an ohm relay connected to said circuit and having a predetermined ohmic setting so that during an out-of-step condition it is operated prior to the operation of said phase displacement responsive relay, and means responsive to said ohm relay being operated for a predetermined time interval prior to the operation of said phase displacement responsive relay for rendering said automatic reclosing means inoperative to reclose said circuit breaker.

5. A control arrangement for a circuit breaker in an alternating current circuit comprising means for opening said circuit breaker in response to a fault and to an out-of-step condition on said circuit including two phase displacement responsive relays so connected to said circuit that predetermined contacts of said relays are simultaneously closed during a fault on said circuit and only during a predetermined portion of each slip cycle when an out-of-step condition exists on said circuit, a time delay relay having an operating winding, a shunt circuit around said winding including said contacts in series, means responsive to an out-of-step condition on said circuit for energizing said operating winding prior to the simultaneous closure of said contacts, means for automatically reclosing said circuit breaker when it is open, and means responsive to said time delay relay being energized for a predetermined time for rendering said reclosing means inoperative to reclose said circuit breaker.

6. A control arrangement for a circuit breaker in an alternating current circuit comprising means including phase displacement responsive means energized from said circuit for effecting an opening of said circuit breaker in response to a plurality of different abnormal conditions on said circuit including an out-of-step condition, means for automatically reclosing said circuit breaker when it is open, a relay connected to said circuit so that in response to an out-of-step condition it is operated prior to the operation of said phase displacement responsive means, and means controlled by said relay and phase displacement responsive means for rendering said automatic reclosing means inoperative to reclose said circuit breaker when said relay is operated prior to said phase displacement responsive means.

7. A control arrangement for a circuit breaker in an alternating current circuit comprising means including phase displacement responsive means energized from said circuit for effecting an opening of said circuit breaker in response to a plurality of different abnormal conditions on said circuit including an out-of-step condition, means for automatically reclosing said circuit breaker when it is open, an ohm relay connected to said circuit and having a predetermined ohmic setting so that in response to an out-of-step condition it is operated prior to said phase displacement responsive means, and means responsive to said ohm relay being operated prior to the operation of said phase displacement responsive means for rendering said automatic reclosing means inoperative to reclose said circuit breaker.

8. A control arrangement for a circuit breaker in an alternating current circuit comprising means including phase displacement responsive means energized from said circuit and a distance relay energized from said circuit for effecting an opening of said circuit breaker in response to a fault and to an out-of-step condition on said circuit, means for automatically reclosing said circuit breaker when it is open, a second relay connected to said circuit so that in response to an out-of-step condition it is operated prior to the operation of said phase displacement means and said distance relay, and means controlled by said second relay for rendering said automatic reclosing means inoperative to reclose said circuit breaker when said second relay is operated prior to said phase displacement responsive means.

ALBERT R. van C. WARRINGTON.